United States Patent [19]

Imai et al.

[11] Patent Number: 5,425,828
[45] Date of Patent: Jun. 20, 1995

[54] PROCESS FOR THE MANUFACTURE OF PNEUMATIC RADIAL TIRES WITH INITIAL FORMATION OF A CENTRAL ANNULAR GROOVE IN THE BELT-TREAD BAND

[75] Inventors: Hiroshi Imai, Kodaira; Hironobu Fukushima, Urawa; Hiroo Matsunaga, Kodaira, all of Japan

[73] Assignee: Bridgestone Corporation, Japan

[21] Appl. No.: 161,344

[22] Filed: Dec. 6, 1993

[30] Foreign Application Priority Data

Aug. 9, 1993 [JP] Japan .................... 5-197216
Sep. 24, 1993 [JP] Japan .................... 5-238232

[51] Int. Cl.⁶ ........................................ B29D 30/44
[52] U.S. Cl. ........................ 156/126; 156/117; 156/128.6; 156/129
[58] Field of Search ............... 156/128.1, 128.6, 129, 156/127, 130, 130.3, 414, 416, 417; 152/538, 454, 209 R

[56] References Cited

U.S. PATENT DOCUMENTS

| | | | |
|---|---|---|---|
| 2,691,335 | 10/1954 | Murray | 152/454 |
| 2,703,517 | 3/1955 | Hooper | 152/454 |
| 3,735,791 | 5/1973 | McKissick | 152/454 |
| 4,308,083 | 12/1981 | Toth, Jr. | 156/129 |
| 5,032,198 | 7/1991 | Kojima et al. | 156/130 |

FOREIGN PATENT DOCUMENTS

| | | | |
|---|---|---|---|
| 834012 | 7/1949 | Germany | |
| 228940 | 10/1986 | Japan | 156/127 |
| 4243601 | 8/1992 | Japan | |
| 4243602 | 8/1992 | Japan | |
| 4243603 | 8/1992 | Japan | |
| 1524068 | 9/1978 | United Kingdom | |

OTHER PUBLICATIONS

Patent Abstracts of Japan, vol. 17, No. 12 (M-1351) 11 Jan. 1993.

*Primary Examiner*—Geoffrey L. Knable
*Attorney, Agent, or Firm*—Sughrue, Mion, Zinn, Macpeak & Seas

[57] ABSTRACT

In the manufacture of pneumatic radial tires each having an annular groove in its central portion, a green tire is formed from a belt-tread band having a constricted portion formed by concavely depressing a belt and a tread inward in a radial direction of the tire.

6 Claims, 10 Drawing Sheets

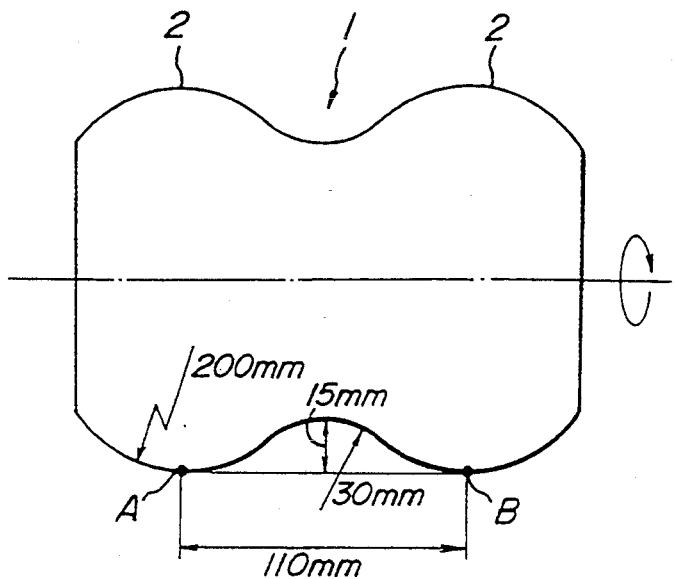
FIG_1
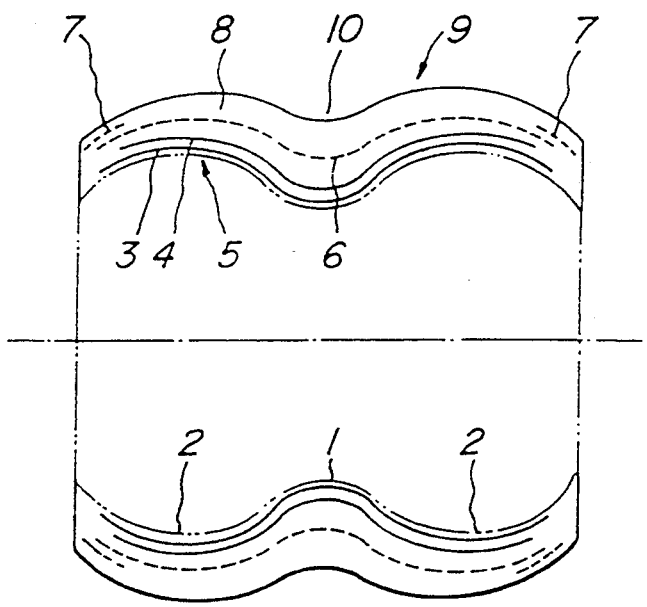
FIG_2
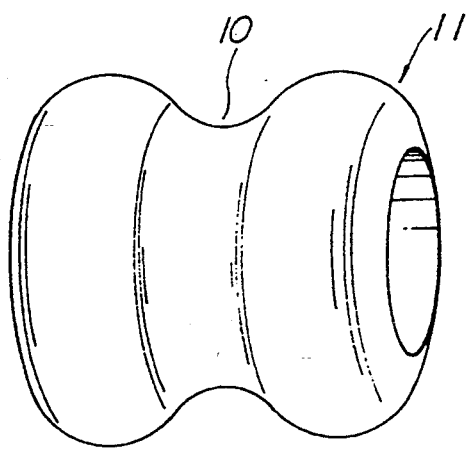
FIG_3

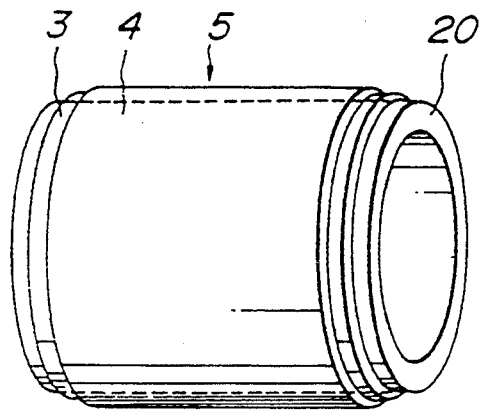
FIG._5a
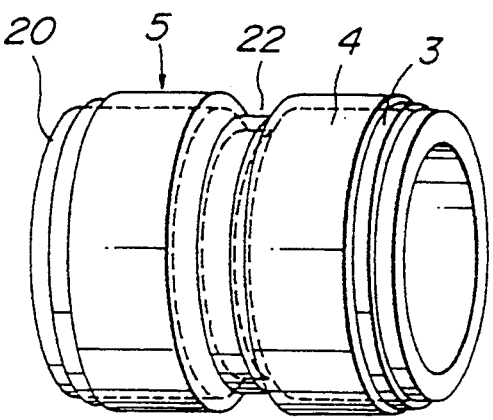
FIG._5b
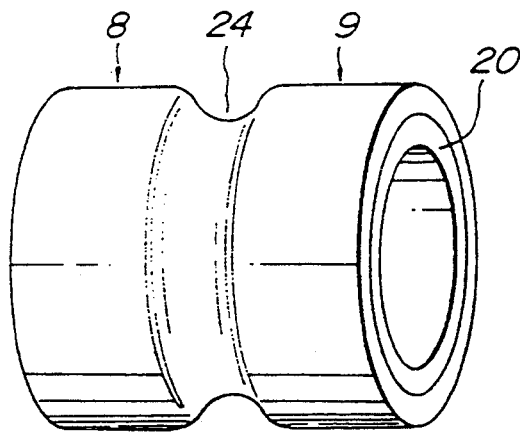
FIG._6

FIG_12

FIG_13

PROCESS FOR THE MANUFACTURE OF PNEUMATIC RADIAL TIRES WITH INITIAL FORMATION OF A CENTRAL ANNULAR GROOVE IN THE BELT-TREAD BAND

BACKGROUND OF THE INVENTION

1. Field of the Invention

This invention relates to a process for the manufacture of pneumatic radial tires in which an annular groove having a wide width and a deep depth is arranged in an approximately central portion of a tread portion in widthwise direction thereof and continuously extends in a circumferential direction of the tire. More particularly it relates to a process for the manufacture of a pneumatic radial tire capable of developing an excellent drainage property even at a completely worn state of a tread portion in a tire product.

2. Description of the Related Art

As this type of the tire, there have hitherto been proposed pneumatic radial tires as disclosed, for example, in JP-A-4-243601, JP-A-4-243602, JP-A-4-243603 and the like. These tires can develop an excellent drainage property even at the completely worn state of the tire tread.

In these conventional techniques, however, it is necessary that a constricted portion is disposed in an approximately central portion of each of carcass and belt in the widthwise direction thereof for the formation of a large annular groove located at the central portion of the tread.

For this end, it is proposed to form such a constricted portion in each of the carcass and belt in the vulcanization building of an ordinary green tire. In this case, the given constricted portions are formed in the carcass and belt during the formation of the large annular groove through a vulcanization mold when the carcass and belt somewhat protrude outward in the radial direction of the green tire at a transverse section thereof and are vulcanized in the same manner as in the conventionally ordinary radial tire. Thus, the depth of the annular groove can be deepened in accordance with the constricted portion formed in the carcass and belt. Consequently a groove volume enough to provide a given drainage property can still be ensured owing to the presence of the constricted portion even at the complete worn state of the tread.

However, when the above forming is applied to the carcass, belt and the like in the vulcanization building, it is very difficult to ensure a sufficient constricted amount, which undesirably affects size expansion ratio of each portion in a tire product, tension of each belt layer and the like after the vulcanization building.

That is, in the above vulcanized tire, the size expansion amount in the vulcanization building is small in the constricted portion of the belt, while the size expansion amount becomes large in the portion of the belt located apart from the constricted portion, so that the constricted portion of the belt is largely expanded as compared with the other portion of the belt when an air internal pressure is applied to the tire product. Consequently the pushing-out of the groove bottom in the annular groove or the decrease of the groove depth in the annular groove is not avoided and it is difficult to ensure the sufficient groove volume at the complete worn state of the tread.

On the other hand, it is considered to control the decrease of the annular groove depth in the inflation of the tire under an internal pressure by pressing down the outer periphery of the constricted portion formed in the belt with a special reinforcing layer comprised of cords substantially extending in the circumferential direction of the tread. In this case, it is obliged to reduce the initial depth of the annular groove only by the thickness of the reinforcing layer, which is also difficult to ensure the sufficient groove volume at the complete worn state of the tread.

SUMMARY OF THE INVENTION

It is, therefore, an object of the invention to solve the aforementioned problems of the conventional technique and to provide a process for the manufacture of pneumatic radial tires capable of ensuring the sufficient groove volume and hence the drainage property even at the complete worn state of the tread by effectively preventing the decrease of the annular groove depth in the inflation of the tire under a given internal pressure without arranging a special reinforcing layer.

According to the invention, there is the provision of a process for manufacturing a pneumatic radial tire comprising a tread wherein an annular groove is arranged in an approximately central portion of the tread in widthwise direction thereof and continuously extends in a circumferential direction of the tread, characterized in that a constricted portion formed by concavely depressing a belt and a tread inward in a radial direction of the tire is formed on an approximately central portion of a cylindrical belt-tread band in a widthwise direction thereof and the belt-tread band is fitted onto an outer side of a green case to form a green tire in which an annular concave groove is existent in an approximately central portion of the green tire in a widthwise direction thereof as it is.

In a preferable embodiment of the invention, a belt is stuck onto an outer periphery of an approximately cylindrical and smooth belt-tread forming drum, and then the drum is subjected to a locally size-enlarging or reducing deformation and a tread is placed on an outer periphery of the belt to form a belt-tread band having constricted portions of the belt and tread in an approximately central portion thereof in its widthwise direction, and thereafter the belt-tread band is fitted onto an outer side of a green case and built to form a green tire having an annular concave groove in an approximately central portion thereof in its widthwise direction.

BRIEF DESCRIPTION OF THE DRAWINGS

The invention will be described with reference to the accompanying drawings, wherein:

FIG. 1 is a schematically front view of an embodiment of the belt-tread building drum used in the invention;

FIG. 2 is a diagrammatically sectional view of an embodiment of the belt-tread band:

FIG. 3 is a schematic view of an embodiment of the green tire used in the invention;

FIG. 5 is a schematic view illustrating a state of forming a constricted portion in a belt;

FIG. 6 is a schematic view illustrating a state of forming a constricted portion in a tread;

DESCRIPTION OF THE PREFERRED EMBODIMENTS

Figure 4:
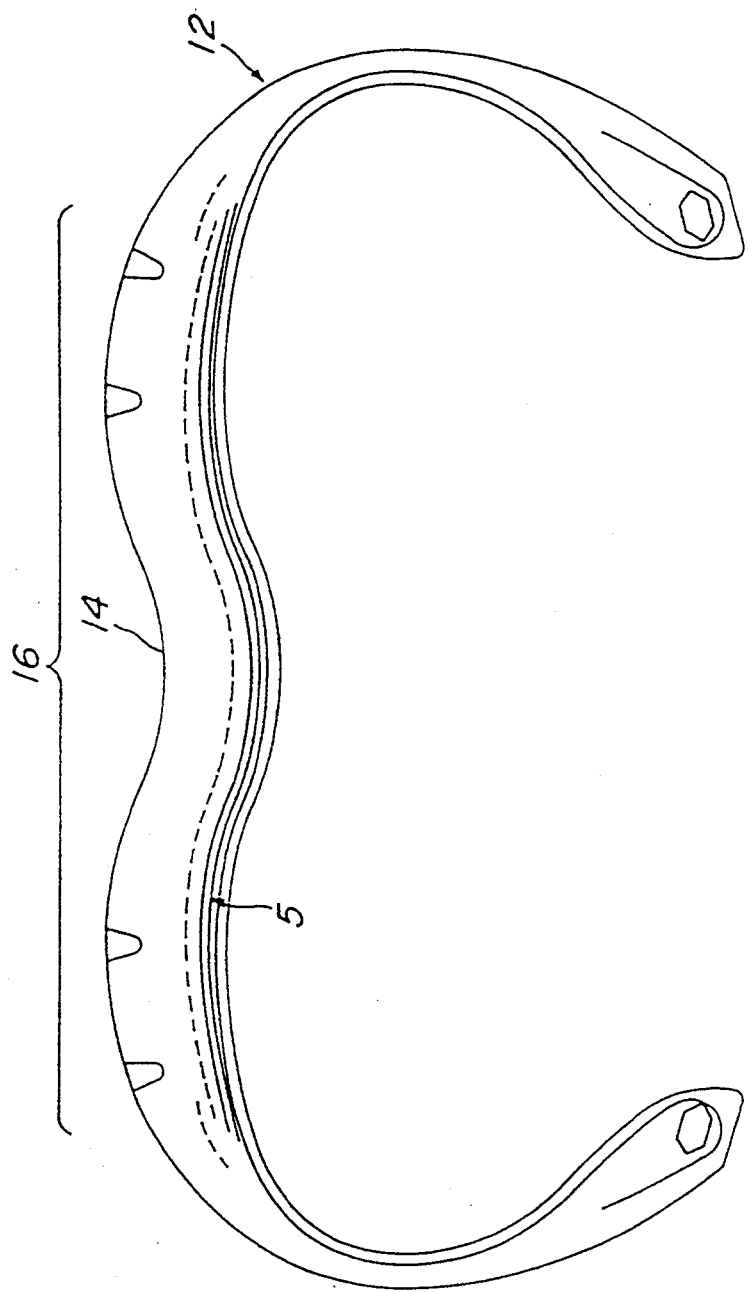
FIG. 4 is a transversely sectional view of an embodiment of the pneumatic radial tire product.

According to the invention, the cylindrical belt-tread band is formed on the belt-tread forming drum to shape constricted portions of the belt and tread in the approximately central portion of the belt-tread band in its widthwise direction, which is then fitted onto the outer periphery side of the green case and built to form the green tire having the annular concave groove in the central portion thereof in its widthwise direction. Next, the green tire is vulcanized in a vulcanization mold having an inner surface shape corresponding to a given tread pattern and the like to form a pneumatic radial tire having a given annular groove at a state of concavely depressing the belt and the tread inward in the radial direction of the tire. In the formation of the constricted portion, it is preferable that the belt is first stuck onto the outer periphery of the cylindrical and smooth belt-tread forming drum and then the drum is subjected to a local size-enlarging or reducing deformation at a given position in the axial direction of the drum before or after the arrangement of an auxiliary belt layer, if necessary, and thereafter, the tread is disposed on the outer periphery side of the belt to form the belt-tread band.

In the process according to the invention, the belt, tread and the like have already constricted portions at the position corresponding to the given annular groove in the tire product at the time of forming the belt-tread band, so that even when such a belt-tread band is assembled onto the green case to form the green tire, the constricted portions are still existent as an annular concave groove in the green tire at a state of deforming the carcass and the like. Consequently, when such a green tire is vulcanized to form a tire product, the annular groove portion of the green tire and hence the belt portion located at the position corresponding thereto is equally enlarged at substantially the same level as in the other portions of the tread in its widthwise direction and pushed into the inner surface of the vulcanization mold. Thus, the existing directions of the cords in the belt become substantially uniform over the full width of the tread.

Even when a given internal pressure is applied to the tire product, therefore, there is no fear of largely expanding only the portion of the tread corresponding to the constricted portion outward in the radial direction of the tire as compared with the other portions of the tread in the widthwise direction and hence the pushing-out of the groove bottom portion in the annular groove is effectively prevented.

As mentioned above, according to the invention, the annular groove having a given groove depth can be formed in the tire product at a state of previously and concavely deforming the tread, belt, radial carcass and the like without arranging the special reinforcing layer on the outer periphery side of the belt and the pushing-out of the annular groove under inflation of a given internal pressure can be prevented. Hence, a sufficient groove volume can surely be held even at a completely worn state of the tread and a desired drainage property can sufficiently be developed.

According to the invention, an auxiliary belt layer may be arranged on the outer periphery side of the belt in order to further improve the high-speed durability of the tire. As the arrangement of the auxiliary belt layer, there may be taken a mode of covering the full width of the belt, a mode of covering only a side portion of the belt, a mode of covering only a central portion of the belt, or a combination of these modes. In this case, the winding tension of the cord in the auxiliary belt layer may be increased or decreased at a given position in the widthwise direction of the belt, e.g. the tensions at the positions corresponding to the side edge portion of the tread and/or the central portion of the tread can be increased as compared with the other portions of the tread.

In FIG. 1 is schematically shown a belt-tread forming drum used in the formation of the belt-tread band according to the invention. The drum is provided at its central portion in widthwise direction with a indentation 1 of a curved profile depressing inward in radial direction and at each side of the dent 1 with a protrusion 2 of a curved profile pushing outward in radial direction. Each of these protrusions 2 has a peak of a height at a position from each side edge of the drum to ¼ of the drum width or a position A, B from each side edge of a tread band to be built to ¼ of the band width.

If it is intended to use such a drum for forming a tread band for a tire having a tire size of 225/50 ZR 16, as shown in FIG. 1, the radius of curvature of the indentation 1 is 30 mm, and the radius of curvature of the protrusion 2 is 200 mm, and the distance between peak positions A and B is 110 mm, and the maximum depth of the dent 1 with respect to a line segment connecting the peak positions A and B to each other is 15 mm.

As sectionally shown in FIG. 2, the formation of the tread band on the drum can be carried out by disposing a belt 5 comprised of two metal cord layers 3, 4, an auxiliary belt layer 6 of nylon cords having a width approximately equal to the width of the belt 5 and a pair of auxiliary belt layers 7 each containing nylon cords and covering only a side portion of the auxiliary belt layer 6 on the drum in this order and then piling a tread 8 on the outermost side thereof. The thus formed belt-tread band 9 is provided at an outer peripheral surface in its central portion in widthwise direction with a constricted portion 10 formed by depressing the belt 5 and the tread 8 inward in the radial direction under an influence of the dent 1 and the protrusions 2 formed in the drum.

The belt-tread band 9 is taken out from the belt-tread forming drum and fitted onto an outer periphery side of a green case formed on another forming drum, which are built together to form a green tire 11 having the constricted portion 10 in its central portion in widthwise direction as shown in FIG. 3.

The green tire 11 is vulcanized in a vulcanization mold having an inner profile corresponding to a given outer profile of a tire product to obtain a tire product 12 provided at its central portion in widthwise direction of the tread with an annular groove 14 having given width and depth as sectionally shown in FIG. 4.

In this case, a portion of the green tire 11 corresponding to a ground contact portion 16 of the tread in the tire product 12 is sufficiently and uniformly enlarged over the full width inclusive of the position of forming the constricted portion 10 during the vulcanization in the vulcanization mold, so that the profile of the ground contact portion 16 in the tire product 12 is very approximate to that of the green tire 11. As a result, the cords in the belt 5 reinforcing the ground contact portion 16 extend in substantially the same direction at any position over the full width of the belt.

In the belt 5 reinforcing the ground contact portion 16, the portion of the belt corresponding to the annular groove 14 is enlarged in size in the same manner as in the other belt portions, so that the pushing-out of the groove bottom in the annular groove 14 can very effectively be prevented in the inflation of the tire product 12 under a given internal pressure without the arrangement of a special reinforcing layer pushing only the portion corresponding to the annular groove 14 at the inner periphery side of the annular groove 14 and at the outer periphery side of the belt 5, whereby the depth of the annular groove 14 can sufficiently be deepened.

When the tire product 12 is mounted onto a standard rim and inflated under a standard internal pressure, the maximum depth of the annular groove 14 is 13 mm.

FIG. 5 shows a belt-tread forming drum 20 used in the formation of the belt-tread band together with a belt and a tread. As shown in FIG. 5a, a belt 5 comprised of two metal cord layers 3, 4 is stuck onto the outer periphery of the drum 20 having a flat shape and, if necessary, an auxiliary belt layer may be arranged on the outer periphery of the belt 5. As shown in FIG. 5b, only the central portion of the drum 20 is deformed to reduce its diameter and then subjected to stitching on the belt to form a constricted portion 22 extending straight over the full periphery of the belt 5 at substantially central portion of the belt in widthwise direction thereof.

When the belt 5 is stuck on the flat drum as mentioned above, the sticking and joining operations of the cord layers 3, 4 causing no stretch deformation and the like can be conducted always properly and simply and rapidly as compared with the case of using the previously size-reduced drum as shown in FIG. 5b.

The formation of the constricted portion 22 in the belt 5 may be carried out by spirally winding a rubberized strip of one or more heat-shrinkable organic fiber cords around the belt 5 located at the size-reduced portion of the drum under a given tension to form an auxiliary belt layer and to closely adhere the belt 5 to the surface of the size-reduced portion as shown in FIG. 5b. Alternatively, a tread as mentioned later is arranged on the outer periphery side of the belt 5, which may be subjected to the stitching to form the constricted portion. In the latter case, the constricted portions are simultaneously formed on both of the belt and the tread.

As shown in FIG. 6, a tread 8 is disposed on the outer periphery side of the belt 5 over the full width of the drum 20. A constricted portion 24 is formed in the approximately central portion of the tread in the widthwise direction thereof owing to the presence of the size-reduced portion of the drum 20. In this way, there is formed a belt-tread band 9 as shown in FIG. 6.

Moreover, in order to facilitate the arrangement of the tread 8 on the outer periphery side of the belt 5, it is preferable to extrude the tread 8 into a previous shape corresponding to the outer profile of the belt 5 as shown in FIG. 5b.

Figure 7:
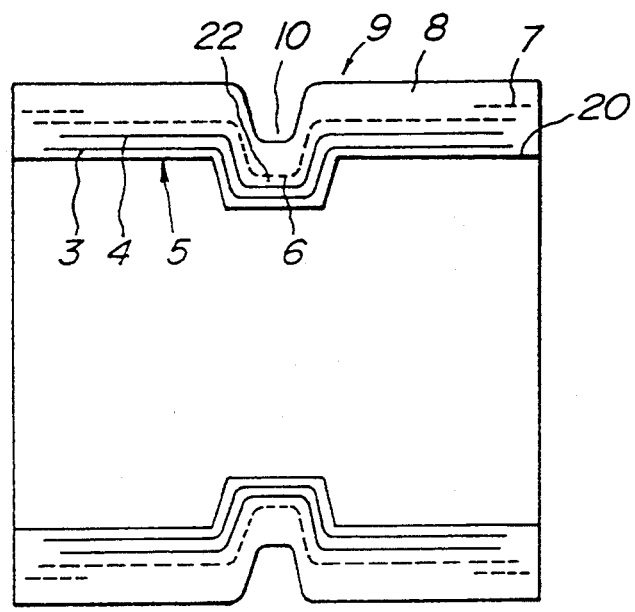
FIG. 7 is an axially sectional view of a belt-tread band.

FIG. 7 is a schematically sectional view of the thus formed belt-tread band 9 in its axial direction, which consists of the belt 5, an auxiliary belt layer 6 of nylon cords having a width approximately equal to that of the belt 5, a pair of auxiliary layers 7 each containing nylon cords and covering only each side portion of the auxiliary belt layer 6 and the tread 8 viewing from the inner side of the drum and has the constricted portion in the approximately central portion thereof in the widthwise direction as a whole.

Figure 8:
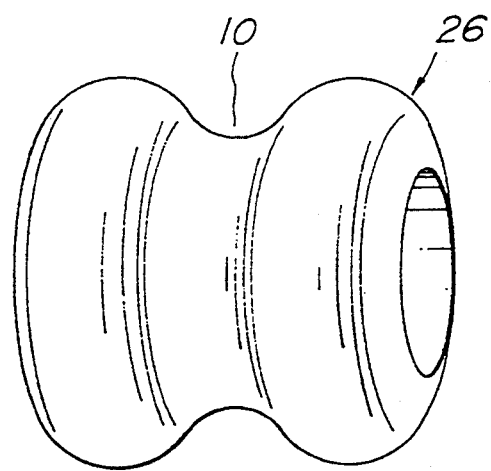
FIG. 8 is a perspective view of a green tire used in the invention.

Thereafter, the belt-tread band 9 is taken out from the belt-tread forming drum 20 and fitted onto an outer periphery side of a green case formed on another forming drum, which are built together to form a green tire 26 having the constricted portion 10 in its central portion in widthwise direction as shown in FIG. 8.

The green tire 26 is vulcanized in a vulcanization mold having an inner profile corresponding to a given outer profile of a tire product to obtain a tire product 12 provided at its central portion in widthwise direction of the tread with an annular groove 14 having given width and depth as sectionally shown in FIG. 4.

The following examples are given in illustration of the invention and are not intended as limitations thereof.

EXAMPLE 1

There are manufactured test tires having a tire size of 225/50 ZR 16, which are mounted on a rim of 7 ½ J and inflated under an internal pressure of 2.0 kgf/cm$^2$ to measure the amount of pushing-out of an annular groove. [Test tires]
Invention tire 1

This tire is manufactured from the belt-tread band shown in FIG. 2 through the belt-tread forming drum shown in FIG. 1.
Conventional tire 1

This tire is manufactured from the belt-tread band having the same reinforcing structure as in the invention tire 1 through the conventionally used flat belt-tread forming drum or a forming drum having no indentation and protrusions provided that the annular groove are formed during the vulcanization building of the green tire.
Conventional tire 2

This tire is the same as in the conventional tire 1 except that a special reinforcing layer is arranged on the outer periphery side of the belt at only a position corresponding to the annular groove.

After each of these tires is mounted on the rim, the depths of the annular groove before and after the inflation under the internal pressure are measured. As a result, the amount of pushing-out of the annular groove bottom is 0.2 mm in the invention tire 1 and the conventional tire 2 and 0.9 mm in the conventional tire 1, respectively.

EXAMPLE 2

After the manufacture of test tires having a tire size of 225/50 R 16, the depth and the amount of pushing-out of the annular groove at the inflation under internal pressure are measured in the same manner as in Example 1
Invention tire 2

Figure 9:
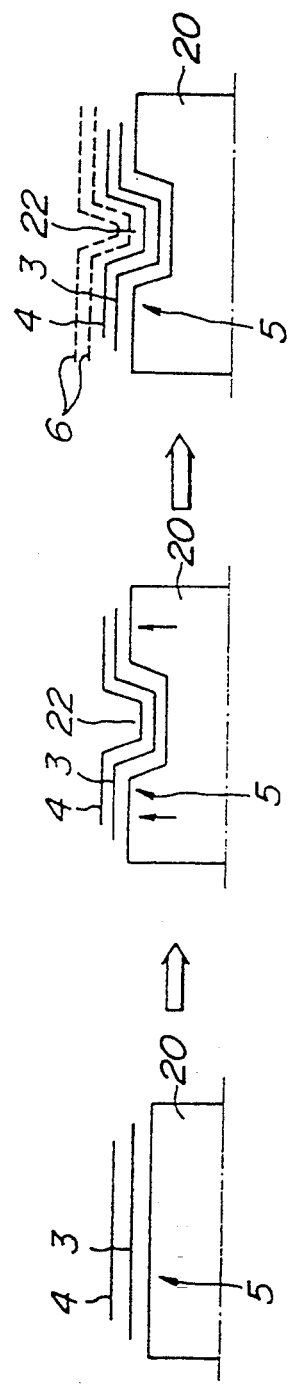
FIGS. 9 to 14 are various flow diagrams of forming the belt-tread band, respectively.

This tire is manufactured from a belt-tread band formed according to steps shown in FIG. 9, in which the belt 5 comprised of two metal cord layers 3, 4 is stuck onto the outer periphery of the flat belt-tread forming drum 20 and diameters in portions of the drum 20 other than a central portion thereof in widthwise direction are increased by 24 mm and then two auxiliary belt layers 6 covering the full width of the belt 5 and the tread 8 (not shown) are disposed on the outer periphery of the belt in order.
Comparative tire 1

This tire is manufactured from a belt-tread band having the same structure as in the invention tire 2 except that the drum is held at a flat state.

Comparative tire 2

This tire has the same structure as in the comparative tire 1 except that a special reinforcing layer is arranged in the central portion of the belt in widthwise direction thereof.

In any tire, a tread pattern including an annular groove 14 is formed by the vulcanization in the same vulcanization mold.

When each of these tires is mounted on a rim of 16×8 JJ and inflated under an internal pressure of 2.3 kgf/cm², the depth of the annular groove is 14.0 mm in the invention tire 2, 13.0 mm in the comparative tire 1 and 13.3 mm in the comparative tire 2, respectively. Furthermore, the amount of pushing-out of the annular groove bottom is 0.3 mm in the invention tire 2, 1.2 mm in the comparative tire 1 and 0.4 mm in the comparative tire 2, respectively.

EXAMPLE 3

Figure 10:
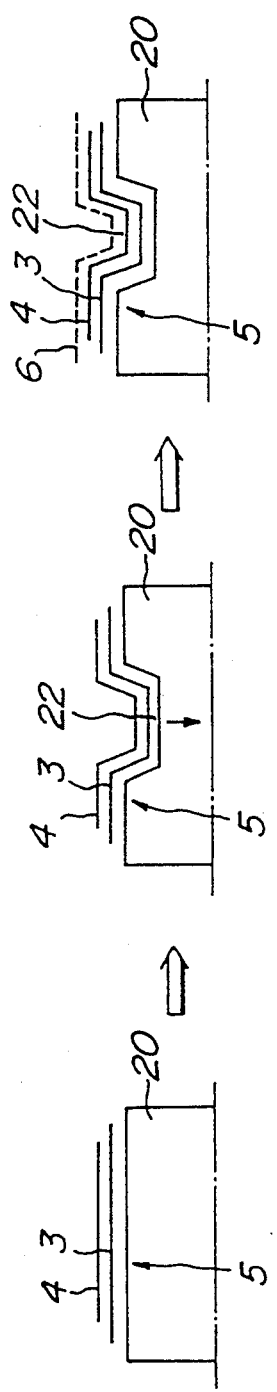

The belt-tread band used in an invention tire 3 is formed according to steps shown in FIG. 10, in which the belt 5 is stuck on the flat forming drum 20 and the diameter in the central portion of the drum 20 in widthwise direction thereof is reduced by 20 mm and then an auxiliary belt layer 6 and the tread 8 are arranged thereon in order.

A comparative tire 3 has the same structure as in the invention tire 3 except that the diameter of the flat forming drum is not changed.

The depth of the annular groove is 13.8 mm in the invention tire 3 and 12.7 mm in the comparative tire 3, while the amount of pushing-out of the annular groove bottom is 0.4 mm in the invention tire 3 and 1.5 mm in the comparative tire 3.

EXAMPLE 4

Figure 11:
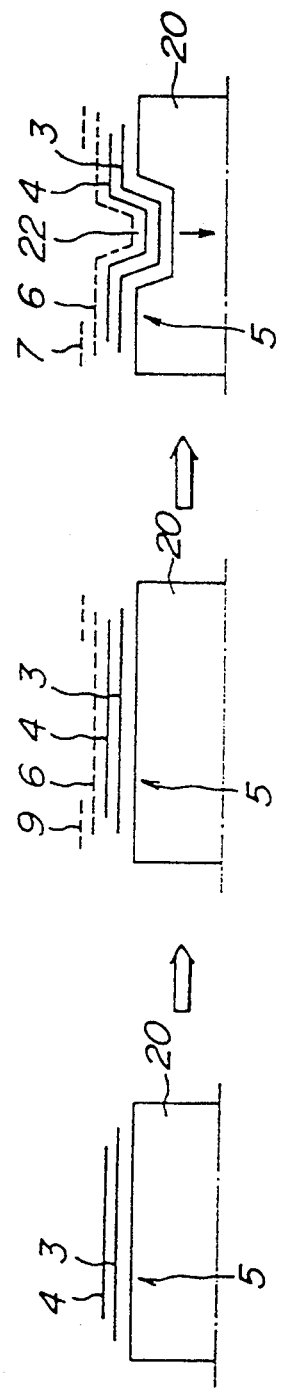

The belt-tread band used in an invention tire 4 is formed according to steps shown in FIG. 11, in which the belt 5 and an auxiliary belt layer 6 and a pair of auxiliary side belt layers 7 are stuck on the flat forming drum 20 in this order and the diameter in the central portion of the drum 20 in widthwise direction thereof is reduced by 20 mm and then the tread 8 are arranged thereon.

A comparative tire 4 has the same structure as in the invention tire 4 except that the diameter of the flat forming drum is not changed.

The depth of the annular groove is 13.5 mm in the invention tire 4 and 12.5 mm in the comparative tire 4, while the amount of pushing-out of the annular groove bottom is 0.6 mm in the invention tire 4 and 1.7 mm in the comparative tire 4.

EXAMPLE 5

Figure 12:
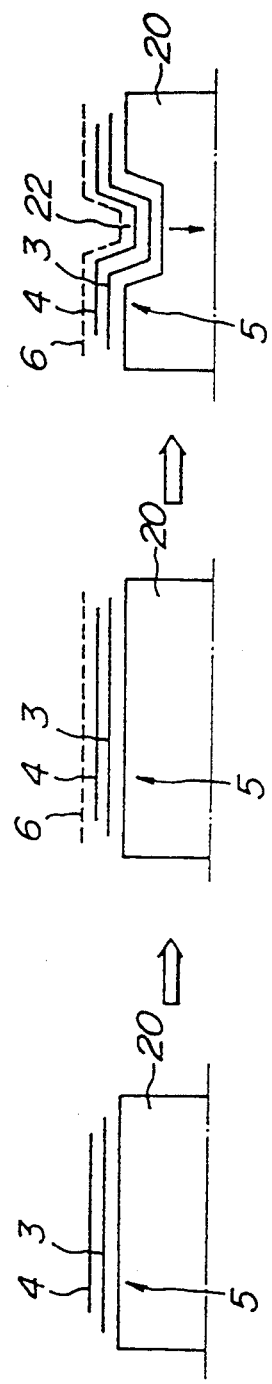

The belt-tread band used in an invention tire 5 is formed according to steps shown in FIG. 12, in which the belt 5 and an auxiliary belt layer 6 are stuck on the flat forming drum 20 in this order, provided that the elongation ratio of the cord in the auxiliary belt layer 6 during the winding is 3.4% at a position corresponding to the central portion of the drum and 1.5% at positions corresponding to the other portions of the drum, and the diameter in the central portion of the drum 20 in widthwise direction thereof is reduced by 20 mm and then the tread 8 are arranged thereon.

A comparative tire 5 has the same structure as in the invention tire 5 except that the diameter of the flat forming drum is not changed and the elongation ratio of the cord in the auxiliary belt layer is 0.8% over its full width.

The depth of the annular groove is 14.0 mm in the invention tire 5 and 12.7 mm in the comparative tire 5, while the amount of pushing-out of the annular groove bottom is 0.2 mm in the invention tire 5 and 1.5 mm in the comparative tire 5.

EXAMPLE 6

Figure 13:
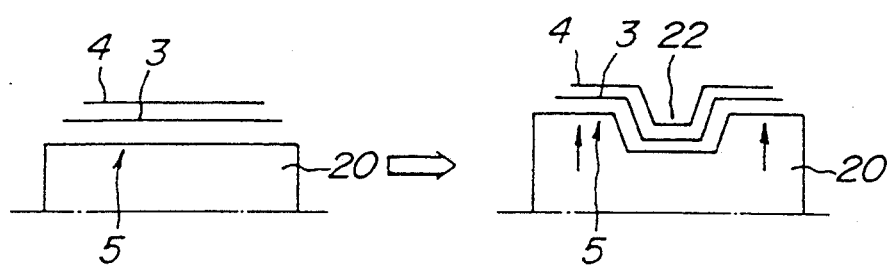

A belt-tread band used in an invention tire 6 having a tire size of 185/70 R14 is formed according to steps shown in FIG. 13, in which the belt 5 comprised of two metal cord layers 3, 4 is stuck onto the outer periphery of the flat belt-tread forming drum 20 and diameters in portions of the drum 20 other than a central portion thereof in widthwise direction are increased by 25 mm and then the tread 8 (not shown) are disposed on the outer periphery of the belt.

A comparative tire 6 has the same structure as in the invention tire 6 except that the diameter of the flat forming drum is not changed.

When each of these tires is mounted on a rim of 14×5 ½JJ and inflated under an internal pressure of 2.0 kgf/cm², the depth of the annular groove is 11.0 mm in the invention tire 6 and 9.5 mm in the comparative tire 6, respectively, while the pushing-out amount of the annular groove bottom is 0.7 mm in the invention tire 6 and 2.0 mm in the comparative tire 6, respectively.

EXAMPLE 7

Figure 14:
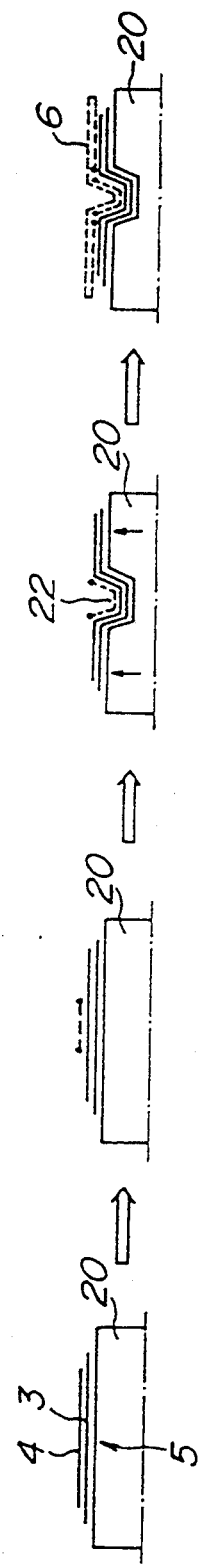

A belt-tread band used in an invention tire 7 having a tire size of 225/50 R16 is formed according to steps shown in FIG. 14, in which the belt 5 is stuck onto the outer periphery of the flat belt-tread forming drum 20 and the cord constituting the auxiliary belt layer 6 is wound at an elongation ratio of 2.0% on the central portion in widthwise direction of the belt 5 and diameters in portions of the drum 20 other than a central portion thereof in widthwise direction are increased by 20 mm and then the cord constituting the auxiliary belt layer 6 is wound at an elongation ratio of 0.8% to form the auxiliary belt layer 6 of two-layer structure and thereafter the tread 8 (not shown) are disposed on the outer periphery of the auxiliary belt layer.

A comparative tire 7 has the same structure as in the invention tire 7 except that the diameter of the flat forming drum is not changed and the elongation ratio of the cord in the auxiliary belt layer having the two-layer structure is 0.8% over the full width of the auxiliary belt layer.

When each of these tires is mounted on a rim of 16×8 JJ and inflated under an internal pressure of 2.3 kgf/cm², the depth of the annular groove is 14.8 mm in the invention tire 7 and 13.0 mm in the comparative tire 7, respectively, while the amount of pushing-out of the annular groove bottom is 0.3 mm in the invention tire 7 and 1.2 mm in the comparative tire 7, respectively.

As seen from the above, according to the invention, the constricted portions are formed in the belt and tread during the formation of the belt-tread band and the annular concave groove is formed by using such a belt-tread band in the formation of the green tire. As a result the annular groove having a sufficient depth can be formed during the vulcanization building of the green tire and also the existing direction of the cords in the belt can sufficiently be uniformized over the full width of the belt. As a result, the pushing-out of the annular groove in the inflation under a given internal pressure can effectively be prevented without using the special reinforcing layer. Moreover, the high-speed durability can be more improved by arranging the auxiliary belt layer(s) between the belt and the tread in the belt-tread band.

What is claimed is:

1. A process for manufacturing a pneumatic radial tire having a tread wherein an annular groove is arranged in an approximately central portion of the tread in widthwise direction thereof and continuously extends in a circumferential direction of the tread, said method comprising the steps of; forming a constricted portion in a belt-tread band by concavely depressing a belt and a tread inward in a radial direction of the band on an approximately central portion of a cylindrical belt-tread band in a widthwise direction thereof and fitting the thus-formed belt-tread band onto an outer side of a green case to form a green tire in which an annular concave groove is existent in an approximately central portion of the green tire in a widthwise direction thereof.

2. The process according to claim 1, wherein the belt is stuck onto an outer periphery of an approximately cylindrical and smooth belt-tread forming drum, and then the drum is subjected to a locally size-enlarging or reducing deformation and the tread is placed on the outer periphery of the belt to form the belt-tread band having constricted portions of the belt and tread in an approximately central portion thereof in its widthwise direction, and thereafter the belt-tread band is fitted onto the outer side of the green case and built to form a green tire having an annular concave groove in an approximately central portion thereof in its widthwise direction.

3. The process according to claim 2, wherein the belt-tread band is provided with at least one auxiliary belt layer arranged between the belt and the tread.

4. The process of claim 3 wherein said belt-tread band is provided with one auxiliary belt layer having a width approximately equal to the width of said belt.

5. The process of claim 4 wherein said belt-tread band is provided with a pair of auxiliary belt layers covering sides of said one auxiliary belt layer.

6. The process of claim 3 wherein the step of providing said at least one auxiliary belt layer comprises the step of spiral winding a rubberized strip of heat shrinkable organic fiber cords around said belt where said constricted portion is to be formed.

* * * * *